United States Patent [19]

Ream, Jr.

[11] Patent Number: 5,432,750
[45] Date of Patent: Jul. 11, 1995

[54] VERTICAL ARRAY DEPLOYMENT DEVICE

[75] Inventor: Donald E. Ream, Jr., Solana Beach, Calif.

[73] Assignee: The United States of America as represented by the Secretary of the Navy, Washington, D.C.

[21] Appl. No.: 552,546

[22] Filed: Nov. 7, 1983

[51] Int. Cl.⁶ .............................................. H04B 1/59
[52] U.S. Cl. ........................................ 367/4; 367/131
[58] Field of Search ................... 367/4, 153, 154, 165, 367/173, 131

[56] References Cited

U.S. PATENT DOCUMENTS

| | | | |
|---|---|---|---|
| 3,944,964 | 3/1976 | Loeser et al. | 367/4 |
| 4,193,057 | 3/1980 | Bennett et al. | 367/153 |
| 4,216,535 | 8/1980 | Bennett | 367/4 |
| 4,272,835 | 6/1981 | Flood et al. | 367/4 |
| 4,330,895 | 5/1982 | Putnam et al. | 367/173 X |

*Primary Examiner*—Daniel T. Pihulic

*Attorney, Agent, or Firm*—Harvey Fendelman; Thomas Glenn Keough

[57] ABSTRACT

A deployment system is disclosed for deploying a vertical, sub-surface buoyed, underwater acoustic sensor array in the ocean which includes a mechanical load transfer and cable separation mechanism which is embodied as a rigid triangular member. The vertical, sub-surface buoyed underwater acoustic sensor array is attached to a support cable which is connected at one end to the sub-surface buoy and at its other end to one of the vertices of the rigid triangular member. An anchor is attached to another vertex of the rigid triangular member and the third vertex of the triangular member is fitted with a strain relief/cable support, rotatable leg that is in turn attached to the deployment or shore cable. After deployment, the triangular member becomes the mechanical link between the array anchor and the array's vertical support member. It also acts as a mounting surface for the necessary electrical cable junction boxes or other required instrumentation and hardware.

17 Claims, 3 Drawing Sheets

VERTICAL ARRAY DEPLOYMENT DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of techniques and systems for deploying underwater equipment. More specifically, the present invention relates to the techniques and apparatus for deploying and implanting on the ocean floor a subsurface buoyed vertical acoustic sensor array.

Previous methods of deploying underwater vertical acoustic sensor arrays have required either expensive mooring of a work platform to keep the array stable while gently lowering the array into the water or, towing or free-falling of the array from a moving platform with the resultant shock and potential damage to the array. A previously utilized deployment technique required two ships or platforms with their crews working in tandem to deploy the array and to moor it on the ocean floor. This previous technique required the mooring of two ocean anchors and connecting these anchors together with a yoke to which the underwater acoustic array was connected. This previous technique was inherently ineffective due to the fact that it required synchronized movement between the two launch vessels, one being equipped with two cranes for deploying the anchors and the other being equipped for deploying the array. It was also inherently inefficient in that it required the utilization of a separate crew for each launch vessel. Further, these prior techniques and apparatus often resulted in the lowering or towing cables becoming entangled with the array.

SUMMARY OF THE INVENTION

The foregoing problems associated with prior techniques and apparatus for deploying underwater vertical acoustic sensor arrays are obviated by the present invention which requires the utilization of only one deployment vessel and crew and requires no divers or underwater robotic equipment.

The vertical array deployment technique and device of the present invention allows an array to be deployed from a moving or stationary platform. Its physical shape keeps the various cables from becoming entangled. The technique and apparatus of the present invention results in a smooth transfer of the various mechanical loads involved which limits any potential deployment damage. Further, the apparatus of the present invention acts as a cable separation device during the actual at-sea deployment process and becomes the array termination device after the array is implanted on the ocean bottom. The apparatus of the present invention does not require recovery as has some previous methods of deployment. Also, the apparatus of the present invention provides convenient attachment points for the various array components and hardware. Additionally, the apparatus of the present invention can be used to install other types of sub-surface buoyed oceanographic instrument packages as well.

OBJECTS OF THE INVENTION

Accordingly, it is the primary object of the present invention to disclose a novel technique and apparatus for deploying and implanting on the ocean floor a subsurface buoyed oceanographic instrument package where the technique and apparatus are relatively inexpensive and relatively simple to effectuate.

It is another object of the present invention to disclose a relatively inexpensive and simple method for deploying and implanting on the ocean floor a sub-surface buoyed vertical sensor array.

It is another object of the present invention to disclose a technique and apparatus for allowing a vertical sensor array or other oceanographic instrument package to be deployed from a single moving or stationary platform.

It is a still further object of the present invention to disclose a technique and apparatus for deploying sub-surface buoyed oceanographic instrument packages while providing a mechanism for keeping the various cables from entangling.

It is a yet further object of the present invention to disclose a technique and apparatus for deploying sub-surface buoyed oceanographic instrument packages for use under adverse deployment conditions and for counter-acting the forces of ocean currents and turbulence.

These and other objects of the invention will become more readily apparent from the ensuing description and claims when taken with the appended drawings.

DESCRIPTION OF THE PREFERRED EMBODIMENT

Figure 1:
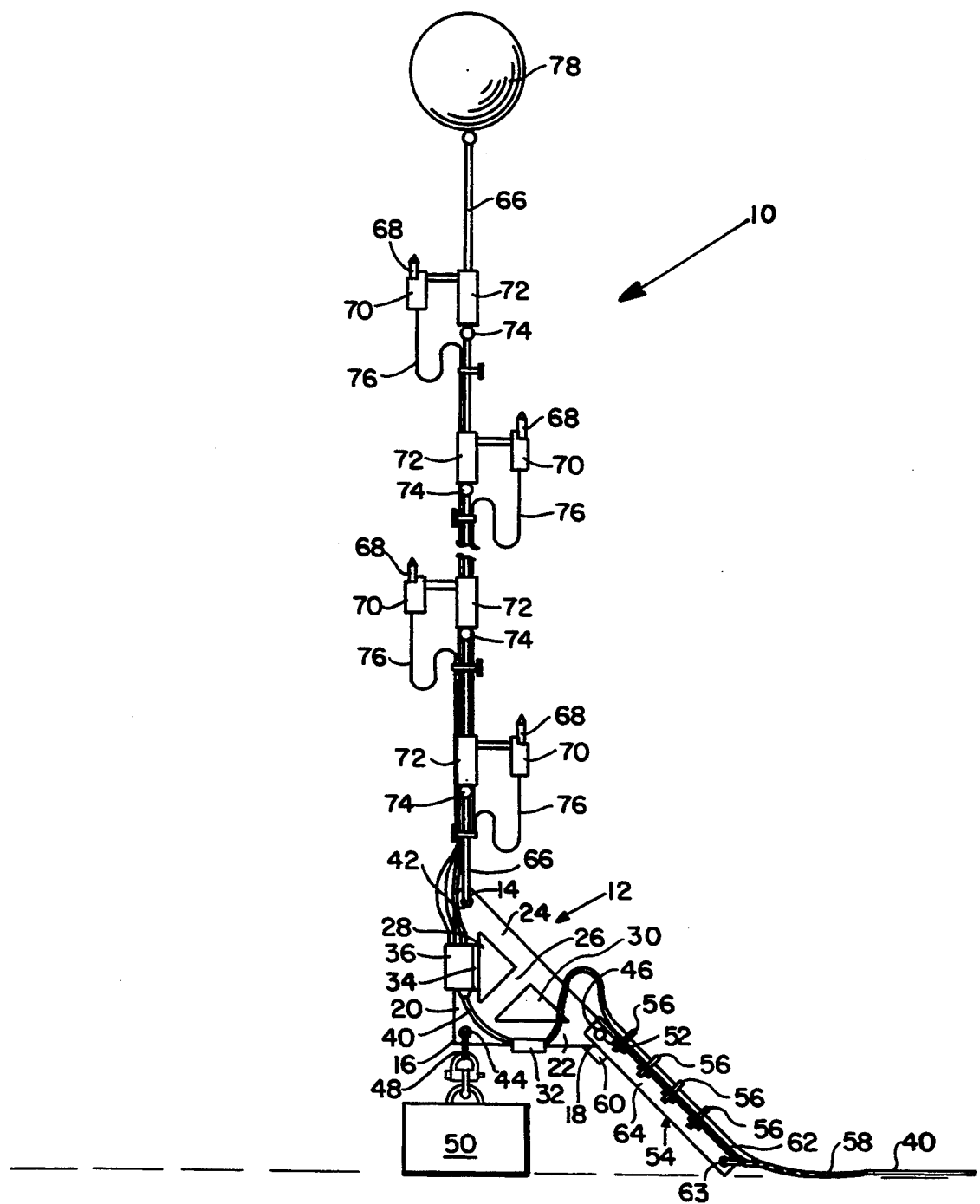
FIG. 1 is a side view of the deployment system of the present invention illustrated in conjunction with a vertical acoustic array.
Figure 3:
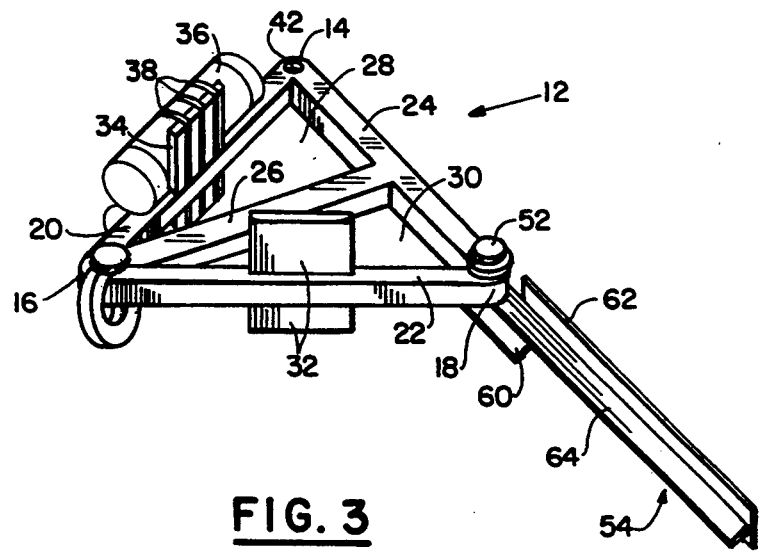
FIG. 3 is an isometric view of the triangular member including the strain relief member of the present invention.

Referring now to FIGS. 1 and 3, the various components of the present invention will be described. A central component of the deployment mechanism 10 of the present invention is a rigid triangular shaped member 12 having a first vertex 14, a second vertex 16 and a third vertex 18. Between vertices 14 and 16 the triangular shaped member 12 includes leg 20, between vertices 16 and 18 the triangular member 12 includes leg 22 and between vertices 14 and 18 the triangular shaped member 12 includes leg 24. An additional support member 26 may be utilized and connected between the vertex 16 and the leg 24 of the triangular member 12. For purposes of reducing forces on the triangle 12 created by ocean currents and turbulence, the triangular member 12 has openings 28 and 30 as is illustrated in FIG. 1. It should be understood that if the support of member 26 is not required, the entire space contained within the space formed by legs 20, 22 and 24 could be open. The triangular member 12 is formed of any suitable metal or other rigid material provided it is sufficiently strong to withstand the forces that would be applied to it in its particular environment and usage.

Also secured to the triangular support member 12 is a first support plate 32 secured to leg 22 of triangular member 12 as by welding or other suitable means. A second support plate 34 is secured to the leg 20 of the triangular member 12 as by welding or other suitable means. In the particular application and usage of applicant's invention of deploying a vertical underwater acoustic array, an electrical junction box 36 is strapped to the support plate 34 by straps 38. Also, as can be seen in FIG. 1, the support plate 32 is utilized as a surface on which to mount the shore cable 40 by suitable means such as U-bolt cable clamps (not shown). Also provided in the triangular member 12 is an aperture in each one of the vertices 14, 16, and 18, specifically, apertures 42, 44 and 46, for receiving connecting mechanisms to be described.

A linking mechanism 48, such as a shackle coupling mechanism as illustrated, is fitted through aperture 44 in apex 16 of the triangular member 12 and serves to couple the triangular member 12 to anchor 50. Any type of linking mechanism 48 appropriate to the particular application and environment could be utilized as would be readily understood by one of ordinary skill in this art. A pin, bolt, rivet or the like 52 is utilized to rotatably secure the strain relief/cable support member 54 to the triangular shaped member 12. By connection 52, the strain relief/cable support member 54 is permitted to rotate about the pivot point around connection 52. In its preferred embodiment, the strain relief/cable support member 54 is embodied as a T-beam as can be more readily seen in FIG. 3. The shore cable 40 is secured to the strain relief/cable support member 54 by means of U-bolt cable clamps 56. The shore cable 40 may further be secured against the possibility of pulling through the cable clamps 56 by means of a cable grip 58 encompassing the shore cable 40 and connected through aperture 63 in the lower end of strain relief/cable support member 54. A suitable type of cable grip 58 is the one sold under the trade name "Kellem" grip.

In the vicinity of vertex 18 of triangular member 12 a first stop member 60, embodied as a short strip of rigid material, is rigidly secured to the triangular member 12 as by welding. In the position of strain relief/cable support member 54 illustrated in FIGS. 1 and 3, the stop member 60 serves to prevent the rotation of strain relief/cable support member 54 towards the vertex 16 beyond the point illustrated in FIGS. 1 and 3. Also, the flange member 62 secured to stem 64 of T-beam 54 serves to prevent the rotation of strain relief/cable support member 54 towards the vertex 14 of triangular member 12 beyond the point at which flange member 62 would contact leg 24 by counter clockwise rotation of member 54 as illustrated in FIG. 3. By utilization of these two stop mechanisms 60 and 62, the strain relief/cable support member 54 is restrained to rotate in a limited arc of rotation. This limited degree of rotation of the strain relief/cable support member 54 serves to maintain the proper orientation of the deployment device of the present invention during the deployment sequence.

Referring again to FIG. 1, an electro-mechanical cable, wire rope or the like 66 serves as a vertical strength member and is coupled through aperture 42 to the triangular member 12 at its vertex 14. Mounted on the support cable 66 is a sub-surface buoyed hydrophone string array comprised of hydrophones 68 which are supported in transducer mounting fixtures 70 which are in turn attached to the support cable 66 by means of attachment fixtures 72. The attachment fixtures 72 are prevented from sliding down support cable 66 by means of stop mechanisms 74 as is well known. Each of the hydrophones 68 is electrically connected to junction box 36 by running an electrical wire 76 down the support cable 66. The electrical wires 76 may be terminated in electrical connectors (not shown) for plugging into electrical junction box 36. The transducers 68 collectively form a vertical hydrophone string array for sub-surface buoying as is well known The other end of support cable 66 is secured to a sub-surface buoy 78. The buoy 78 has sufficient positive buoyancy so that when it is connected to support cable 66 with the attached hydrophone array (or other equipment) and so that when support cable 66 is connected to triangular member 12, the buoy 78 will impart a net positive buoyancy to the member 12, the support cable 66 and the array of hydrophones 68 connected to the support cable 66. The buoyancy of buoy 78 is insufficient however to counteract the negative buoyancy of anchor 50.

Figure 4:
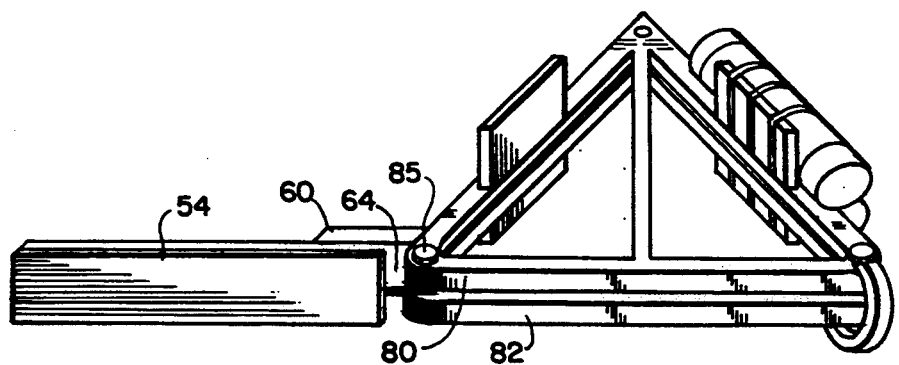
FIG. 4 is an isometric view of an alternate embodiment of the triangular member and strain relief member of the present invention.

In an alternate embodiment of the present invention illustrated in FIG. 4, instead of using a single triangular member such as 12 illustrated in FIG. 3, two identical triangular members 80 and 82 may be used for additional strength, stability and support. The two triangular members 80 and 82 are placed in a congruent relationship as illustrated in FIG. 4 with a small space between them such that the strain relief/cable support member 54 can be coupled to the triangular members 80 and 82 by means of pin 85 which passes through an aperture (not shown) in the stem 64 of the T-beam 54. Similarly, stop member 60 is sandwiched between the two triangular members 80 and 82 and is connected to those triangular members by suitable means such as welding (not shown).

Figure 2:
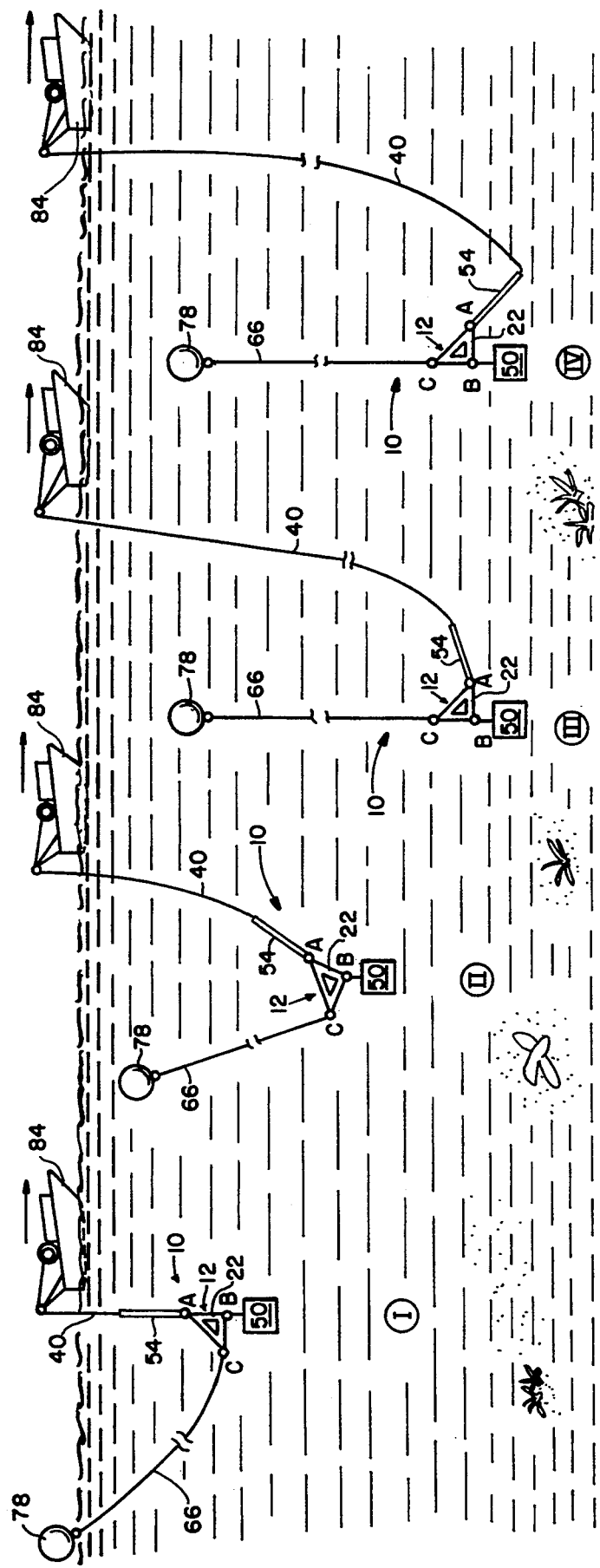
FIG. 2 is a schematic illustration of a deployment sequence in accordance with the present invention.

Referring now to FIG. 2 the operation of the vertical array deployment device will now be described with reference to the deployment sequence illustrated in FIG. 2. The vertical array deployment device 10 of the present invention is deployed from a ship or other floating platform 84. Point A is the attachment point for the strain relief/cable support member 54 which in turn is connected to shore cable 40. Point A corresponds to the aperture 46 in the vertex 18 of triangular member 12. The anchor 50 is attached at point B which point corresponds to aperture 44 in vertex 16 of the triangular member 12. The array support cable with its attached sub-surface buoy 78 is connected to the triangular member at point C which point corresponds to aperture 42 in vertex 14 of triangular member 12. Initially, the buoy 78 is deployed from the vessel 84, sufficiently behind the vessel 84 such that the support cable 66 and its attached hydrophone array 68 is permitted to stream below the buoy 78 into the water as is illustrated. It is noted that in FIG. 2 the hydrophone arrays have not been depicted for purposes of simplicity of illustration. Next, the anchor 50 is deployed from the vessel such that the triangular member 12 and a portion of the shore cable are drawn beneath the surface of the water. It can be seen that in phase 1 of this deployment procedure that the triangular member is positioned such that the leg 22 of the triangular member 12 is in a generally vertical orientation. It can also be appreciated by viewing phase I of FIG. 2 that the buoy 78 and triangular member 12 with its attached strain relief member 54 function to maintain separation between the shore cable 40 and the transducer array 68 which are attached to the support cable 66. As the shore cable 40 is payed out and the array is lowered, the tension in the lowering line 40 is equal to the weight of the anchor 50. As the anchor is lowered further, a point will be reached where the subsurface buoy 78 begins to be pulled under water. This phase is illustrated in phase II of FIG. 2. As this occurs, the portion of the anchor load 50, approximately equal to the buoyancy of the buoy 78, is gradually and smoothly transferred from the lowering line to the array support cable 66. Due to this transfer of a portion of the anchor load from lowering line 40 to support cable 66 due to the pulling of buoy 78 under the surface of the water, a reduction in lowering line 40 tension occurs prior to the actual implant of the anchor 50 on the ocean bottom. This results in a softer bottoming-out of the anchor 50 with less shock to the array 68. When the anchor 50 is firmly implanted on the ocean bottom by further paying out the lowering cable 40 as is illustrated in phase III of FIG. 2, the tension in the lowering line 40 is essentially reduced to its own weight in the water. The triangular support member 12 has now rotated to its fully upright position with points C being pulled towards the surface of the water by the positive buoyancy imparted by buoy 78. In the position illustrated in phase III of FIG. 2, the triangular support member 12 is now the mechanical link between the anchor 50 and the array system. By further paying out the support cable 40, the strain relief member 54 is permitted to rotate down towards the ocean bottom and serves as a support to maintain the triangular member 12 in its implanted position. The bottom of strain relief member 54 in this way provides additional footing to maintain the proper orientation of the transducer array. This action is illustrated in phase IV of FIG. 2. It is also noted that during the deployment of the transducer array between phases I and II as illustrated in FIG. 2, the strain relief member 54 acts as a lever arm to assist in reducing the effect of underwater forces on the vertical array deployment device 10 of the present invention. In this way the strain relief member 54 thus also serves to maintain the proper orientation of the triangular member 12 and the support cable 66 by supplying a correcting torque to the triangular member 12 and the array support cable 66 keeping it from twisting around itself or the lowering line 40. After deployment, strain relief member 54 also acts as a stabilizing and protective ramp for the section of lowering line 40 located between the triangular member 12 and the ocean bottom.

Obviously, many modifications and variations of the present invention are possible in the light of the above teachings. It is therefore to be understood that within the scope of the appended claims the invention may be practiced otherwise than as specifically described.

What is claimed is:

1. An underwater equipment deployment system comprising:
    a rigid triangular shaped member having first, second and third vertices;
    an equipment support member having first and second ends, said first end being coupled to said first vertex;
    underwater equipment secured to said equipment support member;
    a negative buoyancy member coupled to said second vertex;
    a first cable secured to said rigid triangular member and being operably connected to said underwater equipment; and
    a buoy secured to said equipment support member second end.
2. The system of claim 1 wherein:
    said buoy has sufficient buoyancy to impart positive buoyancy to said equipment support member and to said underwater equipment secured to said equipment support member such that said buoy, said equipment support member and said underwater equipment have a combined net positive buoyancy.
3. The system of claim 2 wherein:
    said underwater equipment comprises an underwater vertical transducer array.
4. The system of claim 1 wherein:
    said underwater equipment comprises an underwater vertical transducer array.
5. The system of claim 4 wherein said equipment support member comprises a second cable.
6. The system of claim 1 wherein said equipment support member comprises a second cable.
7. The system of claim 1 wherein:
    said negative buoyancy member comprises an anchor.
8. The system of claim 1 further comprising:
    an elongated rigid strain relief member having a first end rotatably secured to said rigid triangular shaped member third vertex, said first cable being secured to said elongated rigid strain relief member.
9. The system of claim 8 further comprising:
    first stop means secured to said rigid triangular shaped member in the vicinity of said third vertex for preventing said elongated rigid strain relief member from rotating towards said second vertex beyond a predetermined angle of rotation.
10. The system of claim 9 further comprising:
    second stop means secured to said elongated rigid strain relief member for preventing said elongated rigid strain relief member from rotating towards said first vertex beyond a predetermined angle of rotation.
11. The system of claim 8 wherein:
    said elongated rigid strain relief member comprises a T-beam.
12. The system of claim 8 further comprising:
    said elongated rigid strain relief member having a second end; and
    a cable grip secured to said first cable and to said second end of said elongated rigid strain relief member.
13. The system of claim 1 further comprising:
    an electrical junction box fixed to said rigid triangular shaped member.
14. The system of claim 3 further comprising:
    an electrical junction box fixed to said rigid triangular shaped member.
15. The system of claim 1 wherein:
    said rigid triangular shaped member has a first leg between said first and second vertices, a second leg between said second and third vertices and a third leg between said third and first vertices; and wherein said system further comprises:
    first and second support plates secured to said first and second legs, respectively.
16. The system of claim 1 wherein said rigid triangular shaped member has at least one opening therein for permitting the passage of fluid therethrough.

17. A method of deploying an underwater vertical transducer array comprising the steps of:
a) mounting said underwater vertical transducer array to a support cable that has first and second ends;
b) attaching a buoy to said first end of said support cable, the buoy being sufficiently buoyant to impart positive buoyancy to the underwater vertical transducer array and to the support cable;
c) attaching the second end of said support cable to one vertex of a rigid triangular shaped member;
d) attaching a second vertex of said rigid triangular shaped member to an anchor;
e) securing a deployment cable to said rigid triangular shaped member;
f) connecting said deployment cable to said underwater vertical transducer array;
g) deploying the buoy, the underwater vertical transducer array, the support cable, the rigid triangular shaped member, the anchor, and the deployment cable into the water such that the buoy floats and such that the support cable and underwater vertical transducer array extend between the buoy and the rigid triangular shaped member;
h) paying out the deployment cable until the anchor rests on the water's bottom such that the buoy is pulled under the surface of the water.

* * * * *